United States Patent
Paul

(10) Patent No.: US 11,860,301 B2
(45) Date of Patent: Jan. 2, 2024

(54) DEVICE AND METHOD FOR TESTING A DISTANCE SENSOR

(71) Applicant: dSPACE digital signal processing and control engineering GmbH, Paderborn (DE)

(72) Inventor: Jeffrey Paul, Torrance, CA (US)

(73) Assignee: DSPACE GMBH, Paderborn (DE)

( * ) Notice: Subject to any disclaimer, the term of this patent is extended or adjusted under 35 U.S.C. 154(b) by 225 days.

(21) Appl. No.: 17/353,905

(22) Filed: Jun. 22, 2021

(65) Prior Publication Data

US 2022/0404464 A1 Dec. 22, 2022

(51) Int. Cl.
G01S 7/40 (2006.01)

(52) U.S. Cl.
CPC .......... *G01S 7/4065* (2021.05); *G01S 7/4021* (2013.01); *G01S 7/4069* (2021.05); *G01S 7/4086* (2021.05)

(58) Field of Classification Search
CPC .... G01S 7/4065; G01S 7/4069; G01S 7/4086; G01S 7/4021
See application file for complete search history.

(56) References Cited

U.S. PATENT DOCUMENTS

| | | | |
|---|---|---|---|
| 4,521,780 A * | 6/1985 | Preikschat | G01S 7/4052 342/170 |
| 6,710,737 B1 * | 3/2004 | Cronyn | G01S 7/4052 342/174 |

(Continued)

FOREIGN PATENT DOCUMENTS

| | | |
|---|---|---|
| DE | 10 2019 106632 A1 | 9/2019 |
| WO | WO 2020141151 A1 | 7/2020 |
| WO | WO 2020165191 A1 | 8/2020 |

*Primary Examiner* — Timothy A Brainard
*Assistant Examiner* — Helena H Seraydaryan
(74) *Attorney, Agent, or Firm* — LEYDIG, VOIT & MAYER, LTD.

(57) ABSTRACT

A testing device for testing a distance sensor that operates using electromagnetic waves includes: a receiving element for receiving an electromagnetic free-space wave as a receive signal ($S_{RX}$); and a radiating element for radiating an electromagnetic output signal ($S_{TX}$). In a test mode, a test signal unit generates a test signal ($S_{test}$), and the radiating element is configured to radiate the test signal ($S_{test}$) or a test signal ($S'_{test}$) derived from the test signal ($S_{test}$) as the electromagnetic output signal ($S_{TX}$). In the test mode, an analysis unit is configured to analyze the receive signal ($S_{RX}$) or the derived receive signal ($S'_{RX}$) in terms of its phase angle (Phi) and/or amplitude (A) and store a determined value of phase angle (Phi) and/or amplitude (A) synchronously with the radiation of the test signal ($S_{test}$) or of the derived test signal ($S'_{test}$) as the electromagnetic output signal ($S_{TX}$).

14 Claims, 4 Drawing Sheets

(56) References Cited

U.S. PATENT DOCUMENTS

| | | | |
|---|---|---|---|
| 8,018,383 B1* | 9/2011 | Schantz | G01S 5/02213 |
| | | | 342/453 |
| 11,091,169 B2 | 8/2021 | Druml | |
| 2005/0018540 A1* | 1/2005 | Gilbert | G01S 7/52095 |
| | | | 367/138 |
| 2014/0240161 A1* | 8/2014 | Davidson | H04K 3/00 |
| | | | 356/28 |
| 2019/0291743 A1* | 9/2019 | Druml | G01S 7/497 |
| 2022/0082658 A1 | 3/2022 | Paul et al. | |

* cited by examiner

DEVICE AND METHOD FOR TESTING A DISTANCE SENSOR

FIELD

The invention relates to a testing device for testing a distance sensor that operates using electromagnetic waves, the testing device including a receiving element for receiving an electromagnetic free-space wave as a receive signal and a radiating element for radiating an electromagnetic output signal. In a simulation mode, the receive signal or a receive signal derived from the receive signal is fed through a delay unit with a settable time delay, and is thus delayed to form a delayed signal as a simulated reflected signal, the delayed signal or a delayed signal derived from the delayed signal being radiated as an output signal via the radiating element.

BACKGROUND

The aforementioned testing devices for testing distance sensors are known from various technical fields and applications, such as, for example, development of control units and control unit testing, in particular in the automotive field. In this regard, reference is made, for example, to WO 2020/165191 A1. Another field of application is end-of-line test benches; i.e., equipment used for testing products (here distance sensors) at the end of a production line. The present case concerns the testing of distance sensors that operate using electromagnetic waves. In the automotive field, the sensors most predominantly used are radar sensors. However, it is fundamentally also possible to test distance sensors which operate in a different frequency range of electromagnetic waves, for example, in the range of visible light, or which operate using electromagnetic radiation sources which emit electromagnetic waves having a long coherence length, such as in laser applications (e.g., lidar).

Using the testing devices described at the outset, it is possible to simulate an object at virtually any distance to the distance sensor to be tested. The basic operating principle of the distance sensors of the type under consideration here is that electromagnetic waves emitted therefrom are reflected by an object in the radiation range of the distance sensor, and the distance sensor receives the reflected electromagnetic waves and determines the distance to the object from the propagation time of the electromagnetic waves. The determination of the signal propagation time is often not performed directly, but via smart signal analyses, such as by determining a frequency difference in a continuous-wave radar system. However, the details of this are not important here.

Thus, in order to test the distance sensor, the testing device described at the outset is positioned in the radiation range thereof, the testing device receives the free-space waves emitted by the distance sensor and delays this receive signal via its delay unit according to a set time delay, and then radiates the delayed signal via its radiating element back toward the distance sensor to be tested, thereby giving the distance sensor the impression of an object that is spaced apart by a distance corresponding to the set time delay.

When a distance sensor emits an electromagnetic wave into free space, the wavefronts of the emitted electromagnetic waves become increasingly plane with increasing distance from the distance sensor. In the simplest case, the waves are spherical waves whose radii of curvature increase proportionally to the distance from the distance sensor. In the case of large distances, the wavefronts obtained are virtually completely plane.

In the testing of many antenna assemblies, and also in the testing of the distance sensors under consideration here, when large object distances are simulated, it is not only important to observe corresponding delay times, but also to operate with plane wavefronts, which are characteristic of large object distances. For example, many distance sensors operate with a plurality of receiving elements, so that a received free-space wave can be checked for planeness. If the receiving elements then receive signals with a relatively large time delay, but with phase differences between the receiving elements which phase differences do not correlate with a plane free-space wave, then this may result in erroneous test results or inadvertently cause error conditions.

In the prior art, it is known to simulate large object distances using distance sensor test benches having a folded optical path. In this connection, it is common to use a parabolically shaped beam deflector which reshapes spherical free-space waves into free-space waves having plane wavefronts. Such a distance sensor test bench then has a testing device of the type previously described for testing a distance sensor that operates using electromagnetic waves, a beam deflector, and a holding and positioning device for receiving a distance sensor to be tested. The testing device, in turn, has a receiving element, a radiating element, and a delay unit. During testing of the distance sensor, the distance sensor emits an electromagnetic free-space wave, which then initially strikes the beam deflector and is reflected toward the testing device, whereupon it has a plane wavefront. The deflection of the optical path via the beam deflector also results in a longer distance traveled by the free-space wave, but this is not the most important effect. The most important effect lies in the shaping of a plane wavefront. As described earlier, the signal propagation time is produced by the testing device. The testing device receives the free-space wave reflected by the beam deflector, delays it, and emits it back toward the beam deflector. Again, the free-space wave has spherical wavefronts which are reshaped into plane wavefronts upon reflection at the beam deflector. The delayed, simulated reflected signal then reaches the distance sensor to be tested, which can thus be checked for proper functioning. Such systems for far-field antenna measurement are also referred to as compact antenna test ranges (CATR).

The components of such distance sensor test benches; i.e., testing device, beam deflector, and holding and positioning device for the distance sensor to be tested, must be precisely aligned with respect to each other; even small deviations from the ideal configuration can lead to distorted and useless measurement results. What is decisive is the question of whether wavefront planeness is ensured in the measurement area directly in front of the distance sensor to be tested; i.e., in the so-called "quiet zone," particularly in a direction perpendicular to the propagation direction of the free-space wave to be received. In order to verify this, distance sensor test benches are regularly checked for accurate adjustment and calibrations. To this end, it is generally necessary to replace the testing device; i.e., the distance simulator, with an active transmitter capable of generating a suitable test signal. Also, a measuring device capable of measuring the wavefront in the quiet zone of the normally installed distance sensor, namely by measuring the amplitude and/or phase of the incoming free-space wave, must be placed in the position of the distance sensor that is normally to be tested. This approach is extremely complex and costly.

SUMMARY

In an exemplary embodiment, the present disclosure provides a testing device for testing a distance sensor that operates using electromagnetic waves. The testing device includes: a receiving element for receiving an electromagnetic free-space wave as a receive signal ($S_{RX}$); and a radiating element for radiating an electromagnetic output signal ($S_{TX}$). In a simulation mode, the receive signal ($S_{RX}$) or a receive signal ($S'_{RX}$) derived from the receive signal ($S_{RX}$) is fed through a delay unit with a settable time delay ($t_{delay, set}$), and is thus delayed to form a delayed signal ($S_{delay}$) as a simulated reflected signal, and the radiating element is configured to radiate the delayed signal ($S_{delay}$) or a delayed signal ($S'_{delay}$) derived from the delayed signal ($S_{delay}$) as the electromagnetic output signal ($S_{TX}$). In a test mode, a test signal unit generates a test signal ($S_{test}$), and the radiating element is configured to radiate the test signal ($S_{test}$) or a test signal ($S'_{test}$) derived from the test signal ($S_{test}$) as the electromagnetic output signal ($S_{TX}$). In the test mode, an analysis unit is configured to analyze the receive signal ($S_{RX}$) or the derived receive signal ($S'_{RX}$) in terms of its phase angle (Phi) and/or amplitude (A) and store a determined value of phase angle (Phi) and/or amplitude (A) synchronously with the radiation of the test signal ($S_{test}$) or of the derived test signal ($S'_{test}$) as the electromagnetic output signal ($S_{TX}$).

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
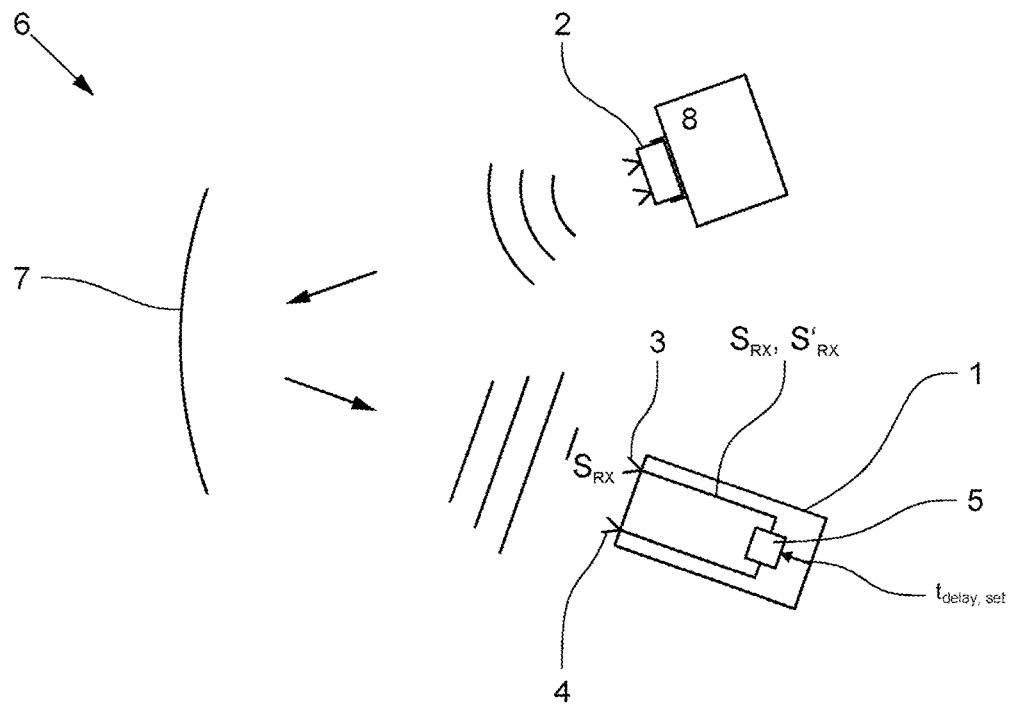
FIGS. 1a and 1b schematically show a distance sensor test bench having a folded optical path as known from the prior art.

Exemplary embodiments of the present invention provide a device and a method for allowing a distance sensor test bench to be tested with little technical effort and cost.

In an exemplary embodiment, a testing device for testing a distance sensor that operates using electromagnetic waves is provided. In a test mode, a test signal unit generates a test signal, and the test signal or a test signal derived from the test signal is radiated as an output signal via the radiating element, an analysis unit analyzing the receive signal or the derived receive signal in terms of its phase angle and/or amplitude and storing the determined value of phase angle and/or amplitude in the test mode synchronously with the radiation of the test signal or of the derived test signal as an output signal. The implementation of the test signal unit makes it possible to generate a test signal and radiate it via the radiating element into the external space as needed. This is not possible with the testing devices that form the basis of the invention because they only radiate previously received signals with a suitable time delay. With the measures described, the testing device can be left in its installed position for the testing of a distance sensor test bench; i.e., the testing device does not need to be replaced with a special transmitter.

In exemplary embodiments, the transmitted test signal or the test signal derived from the test signal is reflected in the distance sensor test bench assembly and received by the testing device. Thus, the receive signal then received by the testing device corresponds to the transmitted and reflected signal in the test mode. This receive signal or the receive signal derived therefrom can then be analyzed in terms of its phase angle and/or amplitude by the analysis unit. The analysis is usually performed with respect to a reference signal, which may be, for example, the transmitted test signal.

In distance sensor test benches having a folded optical path, the testing device and the distance sensor to be tested (or the antenna to be measured) are often spaced apart so that an overall V-shaped optical path is formed. In this case, a preferred embodiment of the testing device is advantageously characterized in that the delay unit, the test signal unit, and the analysis unit are enclosed by a housing, and the receiving element is connected to the housing via a signal line, and thus can be positioned remotely from the housing of the testing device. When it is said that the receiving element is connected to the housing via a signal line, this means, of course, a connection that enables transfer of the receive signal or of a signal derived from the receive signal into the interior of the housing for purposes of further electronic signal processing. With this embodiment, it is possible to place the receiving element in the installed position of the distance sensor to be tested, so that the planeness of the electromagnetic waves can be tested at the testing location of the distance sensor, and solely by the testing device. The testing device itself does not need to perform any analysis of the planeness of the electromagnetic waves; rather, the receive signal or the derived receive signal is analyzed in terms of its phase angle and/or in terms of its amplitude, and corresponding measurement values are held available in the testing device, be it in order to actually perform a further analysis in the testing device itself, or be it to transfer the measurement values via a suitable interface to, for example, an external computer for analyzing the planeness of the received waves therein.

Another preferred embodiment of the testing device provides that the receiving element has a mixer, and that the receive signal be down-converted to a lower intermediate frequency by the mixer. The low-frequency receive signal derived from the receive signal in this manner is transferred via the signal cable at least to the analysis unit enclosed by the housing. This example illustrates why a differentiation is made between the terms "receive signal" and "receive signal derived from the receive signal." The receive signal per se has its origin in the free-space wave picked up by the receiving element. If further signal processing is performed before the receive signal is passed on to one of the further signal processing units (i.e., delay units or analysis unit), then strictly speaking the signal in question is no longer the receive signal itself, but a receive signal derived therefrom. This is the case in the aforementioned exemplary embodiment, where the receive signal is down-converted to a lower intermediate frequency. The advantage of the down-conversion to a lower intermediate frequency is that the transfer of these lower-frequency signals places less demands on the transmission path from the receiving element via the signal line to the further electronic units in the housing of the testing device.

This explanation also clarifies the differentiation between the test signal generated by the test signal unit and a test signal possibly derived therefrom, which is then radiated as an output signal. Accordingly, it could be provided for the test signal to be generated with a relatively low frequency—corresponding to the down-converted intermediate frequency and to be up-converted by a mixer prior to being radiated via the radiating element.

As mentioned earlier, the analysis unit determines the phase angle of the receive signal or the phase angle of the derived receive signal preferably with respect to a reference signal, which may in particular be the test signal or the derived test signal.

An advantageous embodiment of the testing device provides that the analysis unit analyze the receive signal or the receive signal derived from the receive signal in terms of its phase angle through propagation time measurement with respect to the test signal radiated as an output signal or with respect to the derived test signal radiated as an output signal. There are known various methods of how propagation time information can be obtained through smart analysis of the transmitted signal and of the reflected receive signal that originates from the transmitted signal, for example, by using a frequency-modulated signal (chirp signal) as the test signal and mixing the transmit signal and the receive signal so that propagation time information can be readily obtained from the then determined frequency difference.

In particular, it is provided that the test signal or the derived test signal be a pulse, a pulse train, a continuous wave signal, or a frequency-modulated continuous wave signal.

An advantageous refinement of the testing device is characterized in that the analysis unit analyzes a plurality of receive signals or a plurality of derived receive signals in terms of phase angle and/or in terms of amplitude and stores a plurality of values of phase angle and/or amplitude. In the real measurement process, the plurality of values of phase angle and/or amplitude result from the fact that the position of the receiving element in the test mode corresponds to the installed position of the distance sensor to be tested, and that this position is varied. Thus, the quiet zone of the distance sensor that is normally to be tested can be scanned and measured linearly or two-dimensionally by positional variation of one or two position variables. The deviations of the measured phase angles and/or amplitudes from measurement point to measurement point are a measure of the planeness of the incoming waves in the quiet zone. The deviations allow a conclusion to be drawn as to whether the distance sensor test bench to be tested still meets the accuracy requirements or needs to be recalibrated. The analysis of the measured phase angles and/or amplitudes with respect to wave planeness can be, but does not have to be, performed in the testing device.

In an advantageous embodiment, the testing device has a communication interface via which an external computer is connectable to the testing device. The testing device, particularly the analysis unit of the testing device, then transfers at least one value of phase angle and/or amplitude of the receive signal or of the derived receive signal via this communication interface to the external computer. There, the phase angles and/or amplitudes of the receive signal can be analyzed, and conclusions can be drawn about the planeness of the waves and about the alignment of the various components of the distance sensor test bench.

An advantageous refinement of the aforementioned embodiment provides that the testing device generate the test signal in response to an external request received via the communication interface, and radiate the test signal or a test signal derived from the test signal as an output signal via the radiating element, and analyze the receive signal or the derived receive signal in terms of its phase angle and/or in terms of its amplitude synchronously with the radiation of the output signal.

In another exemplary embodiment, a method is provided for testing a distance sensor test bench having a folded optical path, the distance sensor test bench including a testing device for testing a distance sensor that operates using electromagnetic waves, a beam deflector, and a holding and positioning device for receiving a distance sensor to be tested in a mounting fixture. The testing device includes a receiving element, a radiating element, a delay unit, a test signal unit, and an analysis unit, the receiving element serving for receiving an electromagnetic free-space wave as a receive signal, and the radiating element serving for radiating an electromagnetic output signal. In the known simulation mode, the receive signal or a receive signal derived from the receive signal is fed through the delay unit with a settable time delay during the testing of the distance sensor, and is thus delayed to form a delayed signal as a simulated reflected signal. In order to test the distance sensor, the delayed signal or a signal derived from the delayed signal is radiated as an output signal via the radiating element.

In a test mode, a test signal unit generates a test signal, and the test signal or a test signal derived from the test signal is radiated as an output signal via the radiating element. In the test mode, the analysis unit analyzes the receive signal or the derived receive signal in terms of its phase angle and/or its amplitude synchronously with the radiation of the test signal or of the derived test signal as an output signal. The determined value of phase angle and/or the amplitude is stored.

Furthermore, in terms of device design, it is provided that the delay unit, the test signal unit, and the analysis unit be enclosed by a housing, the housing being stationarily disposed in the distance sensor test bench. The receiving element of the testing device is connected to the housing via a signal line, and thus can be positioned remotely from the housing of the testing device.

For purposes of testing the distance sensor test bench, the receiving element of the testing device is placed in the mounting fixture of the holding and positioning device, a plurality of test positions being approached via the positioning device along an axis or in a plane in front of the receiving element in the mounting fixture of the holding and positioning device. At least one test operation is performed in each of a plurality of test positions, and thus a plurality of phase angles and/or amplitudes are determined, and the determined values of phase angle and/or amplitude are stored, in particular together with the position coordinate or the position coordinates of the approached test positions. The axis or the plane in which the approached test positions lie in front of the receiving element ideally extend perpendicular to the expected direction of travel of the incoming wave. The planeness of the wave in the quiet zone in front of the distance sensor that is actually to be tested can be inferred based on the phase angles and/or amplitudes determined in different positions. The determination of the planeness of the wave may be performed in the testing device itself, but the acquired data may also be transferred via an interface to an external computer and analyzed therein.

The described testing device and the described method according to the independent patent claims may be refined and designed and in a variety of specific ways. This is illustrated in connection with the figures.

Figure 1B:
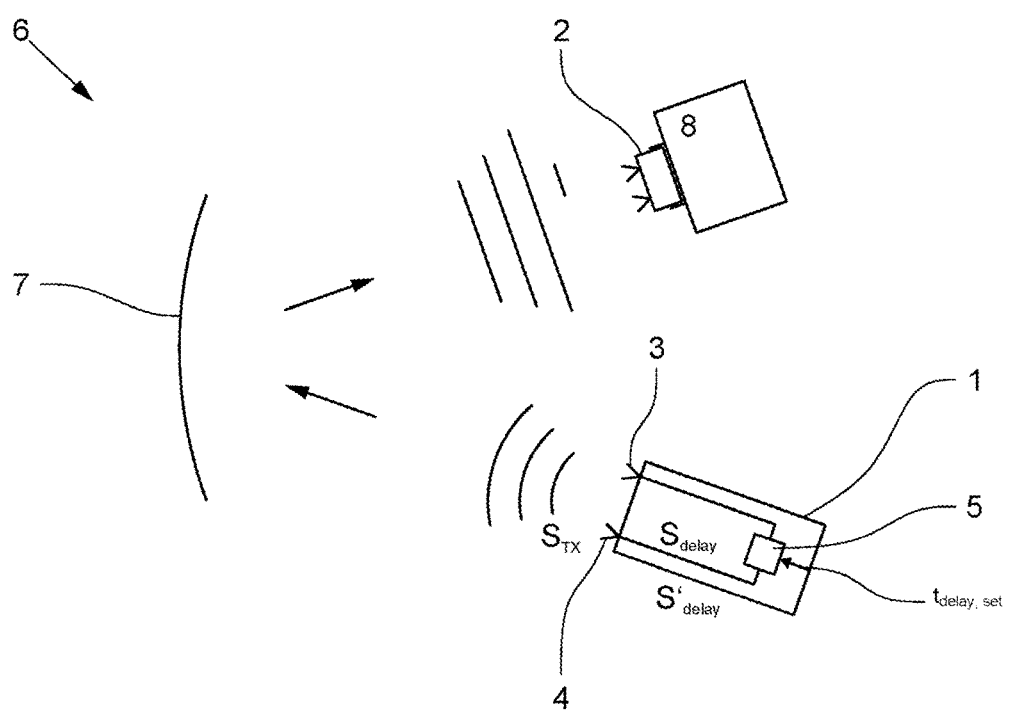
Figure 2:
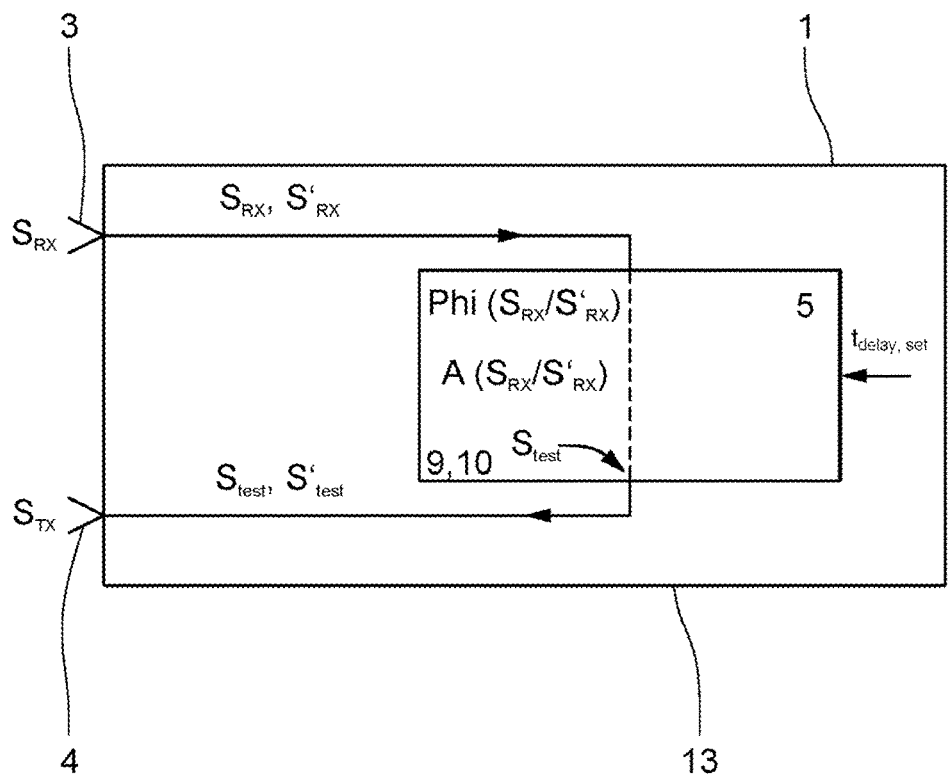
FIG. 2 schematically shows a testing device for testing a distance sensor that operates using electromagnetic waves, with a test signal unit and an analysis unit.

All figures show a testing device 1 for testing a distance sensor 2 that operates using electromagnetic waves, with FIGS. 1a and 1b showing testing devices 1 known from the prior art. In their basic function, which is a simulation mode, all testing devices 1 serve to simulate an object spaced apart from distance sensor 2, this spaced-apart object being simulated to a distance sensor 2 to be tested.

The depicted testing devices 1 all have a receiving element 3 for receiving an electromagnetic free-space wave as a receive signal $S_{RX}$ and a radiating element 4 for radiating an electromagnetic output signal $S_{TX}$. In a simulation mode, the receive signal $S_{RX}$ or a receive signal $S'_{RX}$ derived from the receive signal $S_{RX}$ is fed through a delay unit 5 with a settable time delay $t_{delay, set}$, and is thus delayed to form a delayed signal $S_{delay}$ as a simulated reflected signal. The delayed signal $S_{delay}$ or a delayed signal $S'_{delay}$ derived from the delayed signal $S_{delay}$ is then radiated as an output signal $S_{TX}$ via radiating element 4.

FIGS. 1a and 1b illustrate the use of such a testing device 1 such as is known in the prior art. Here, testing device 1 is part of a distance sensor test bench 6 having a folded optical path. In distance sensor test bench 6, the testing device 1 for testing a distance sensor 2 that operates using electromagnetic waves is positioned together with a beam deflector 7 and a holding and positioning device 8 for receiving a distance sensor 2 to be tested. In FIG. 1, it can be seen that the distance sensor 2 to be tested—for example, during an end-of-line test—emits an electromagnetic wave having a curved wavefront. Beam deflector 7 is parabolically shaped and serves to shape the reflected waves into waves having a plane wavefront. This is symbolized by the curved and parallel lines.

In the simulation mode of distance sensor test bench 6, testing device 1 serves to simulate an object spaced an arbitrary distance apart in the sensing area of the distance sensor 2 to be tested. Via receiving element 3, testing device 1 receives the free-space wave $S_{RX}$ emitted by distance sensor 2 and feeds the receive signal $S_{RX}$ or a receive signal $S'_{RX}$ derived from the receive signal $S_{RX}$ to delay unit 5. A time delay $t_{delay, set}$ is settable for delay unit 5, and delay unit 5 then delays the receive signal $S_{RX}$ or the derived receive signal $S'_{RX}$ according to the set delay $t_{delay, set}$ to form a delayed signal $S_{delay}$. This delayed signal $S_{delay}$ or a signal $S'_{delay}$ derived from the delayed signal $S_{delay}$ is then radiated as an output signal $S_{TX}$ via radiating element 4 toward beam deflector 7, as illustrated in FIG. 1B. What is relevant here is that testing device 1 also radiates output signal $S_{TX}$ as a free-space wave having a curved wavefront. Beam deflector 7 then in turn causes the free-space wave reflected by it to have a plane wavefront after reflection, which is of particular importance in this direction.

As already explained at the outset, when large object distances are simulated, it is not only important that the simulated reflected signal be suitably delayed by delay unit 5, but it is also important that the wavefront of the simulated reflected signal be plane, which is characteristic of far fields for purely geometric reasons. Especially in the case of distance sensors 2 having a plurality of receiving elements 3, the phase angles Phi of waves received by neighboring receiving elements 3 can be analyzed. If phase angle differences are detected that do not correlate with the time delay of the reflected signal (and thus with the object distance determined via the time delay), then this can lead to misinterpretation or even to error conditions of the distance sensor 2 to be tested. This is why the creation of a plane wavefront by beam deflector 7 is essential, especially in this propagation direction.

Even small differences between the various elements of the illustrated distance sensor test bench 6 may have as a consequence that the wavefronts are no longer plane in the measurement area directly in front of the distance sensor 2 to be tested; i.e., in the so-called quiet zone, and that the wavefronts per se are curved or come in at an angle.

In order to ensure proper functioning of the illustrated distance sensor test bench 6, the calibration of distance sensor test bench 6 is rechecked at periodic intervals. To this end, generally, both the testing device 1 and the distance sensor 2 are removed from their respective installed positions and replaced with a corresponding testing apparatus, which includes a transmitter at the installed position of testing device 1 and a corresponding receiver in the installed position of the distance sensor 2 that is normally to be tested. The receiver can then be moved by holding and positioning device 8 in a measurement plane substantially perpendicular to the desired or expected incoming direction of the electromagnetic free-space wave, and the receiver then detects the phase angle and often also the amplitude of the incoming free-space wave at different positions, so that the planeness of the incoming free-space wave can be assessed. If the planeness of the incoming electromagnetic waves in the quiet zone of the receiver does not meet the requirements, the positioning of the various elements of distance sensor test bench 6 must be corrected.

The previously described check for a plane wavefront in the quiet zone in front of the installed position of the distance sensor 2 to be tested, which is located in holding and positioning device 8 in the simulation mode, is very complex and costly.

The testing devices 1 illustrated in FIGS. 2 through 6 enable the distance sensor test bench 6, as shown in FIGS. 1 through 6, to be tested itself, namely as to whether the incoming waves in the quiet zone in front of the installed position of the distance sensor 2 to be tested have a plane phase front. Thus, using the testing device 1 described below, it is no longer necessary to completely change the set-up of distance sensor test bench 6. Rather, it is sufficient to slightly modify the set-up.

FIGS. 2 through 5 only show a suitably designed testing device 1 having an extended functionality that enables the previously described checking of the calibration of distance sensor test bench 6. Each testing device 1 is characterized in that, in addition to the already known delay unit 5, it has a test signal unit 9 which generates a test signal $S_{test}$ in a test mode, the test signal $S_{test}$ or a test signal $S'_{test}$ derived from the test signal $S_{test}$ being radiated as an output signal $S_{TX}$ via radiating element 4.

Through this measure, testing device 1, regardless of whether it receives a receive signal $S_{RX}$ via its receiving element 3, is basically capable of radiating a test signal $S_{test}$ via its radiating element 4, which can then be used to subject the space in front of the distance sensor 2 that is normally to be tested to a test signal suitable for measuring the planeness of the waves. Synchronously with the radiation of the test signal $S_{test}$ or of the derived test signal $S'_{test}$ as an output signal $S_{TX}$, an analysis unit 10 analyzes the synchronously received receive signal $S_{RX}$ or the derived receive signal $S'_{RX}$ in terms of its phase angle Phi and/or in terms of its amplitude A. This is expressed in the figures by the notation $Phi(S_{RX}/S'_{RX})$ and $A(S_{RX}/S'_{RX})$, so the slash is by no means to be understood as a fraction bar, but as a separator indicating an alternative. The determined value of phase angle Phi and/or amplitude A is then stored. This embodiment of testing device 1 basically makes it possible to actively generate a test signal $S_{test}$ (instead of merely using a previously measured signal), and to analyze a resulting receive signal $S_{RX}$ in terms of its phase angle phi and/or in terms of its amplitude A, which is essential for determining the planeness of the incoming free-space wave.

In FIGS. 2 through 6, the different electronic units, namely delay unit 5, test signal unit 9, and analysis unit 10, are schematically disposed within a box that is to be understood in a purely functional sense. What is important here is merely that delay unit 5 and analysis unit 10 each be capable of receiving the receive signal $S_{RX}$ or the signal $S'_{RX}$ derived from the receive signal $S_{RX}$ and that delay unit 5 and test signal unit 9 correspondingly be capable of accessing the signal line connected to radiating element 4 so as to output corresponding signals. It will be appreciated that in various embodiments, the different units may be implemented in a common hardware unit, for example on a common field-programmable gate array (FPGA), in a plurality of hardware and functional units (for example, a plurality of FPGAs or a plurality of signal processors), or may be implemented to be partly digital and partly analog or completely digital.

Figure 3:
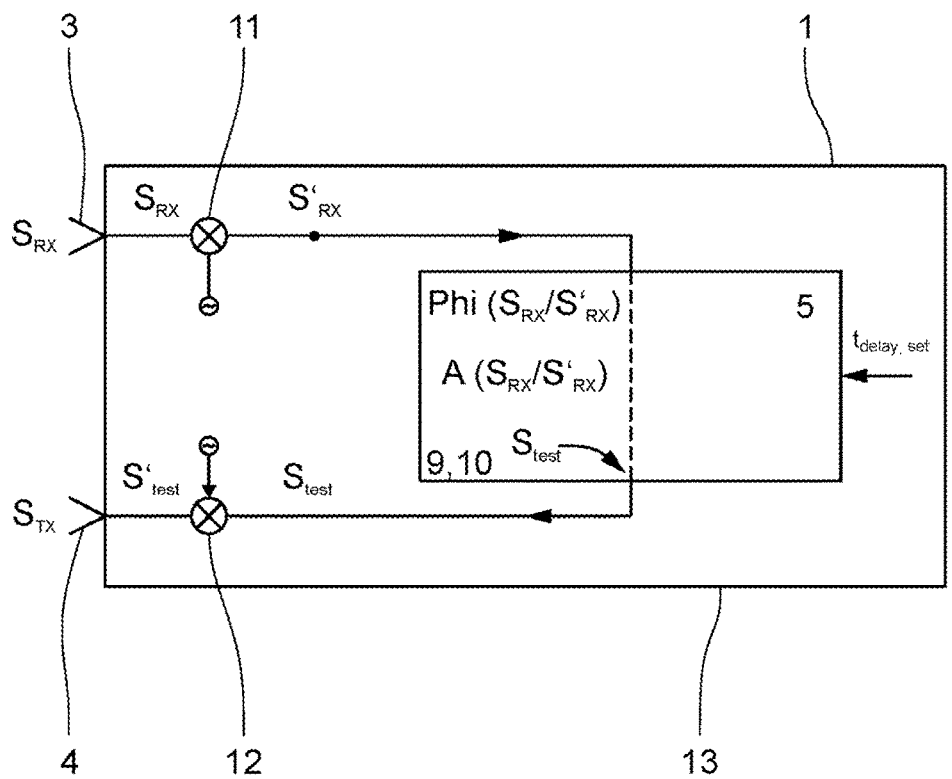
FIG. 3 schematically shows a testing device as in FIG. 2 with additional mixers, FIG. 4 schematically shows a testing device for testing a distance sensor that operates using electromagnetic waves, with a receiving element connected to a housing of the testing device via a signal line, FIG. 5 schematically shows another testing device, where both the receiving element and the radiating element are connected to the housing of the testing device via a signal line.

FIG. 3 exemplarily illustrates what is meant when it says that the receive signal $S_{RX}$ or a receive signal $S'_{RX}$ derived from the receive signal is fed to delay unit 5. It is shown that the receive signal $S_{RX}$ received as a free-space wave via receiving element 3 is down-converted by an input mixer 11 to a lower intermediate frequency, and that thus the signal fed to delay unit 5 or analysis unit 10 is not the originally received receive signal $S_{RX}$, but the receive signal $S'_{RX}$ derived by down-conversion. The equivalent applies respectively to the delayed signal $S_{delay}$ and the delayed signal $S'_{delay}$ derived by up-conversion from the delayed signal $S_{delay}$, and to the test signal $S_{test}$ generated by analysis unit 10 or the test signal $S'_{test}$ derived through up-conversion by an output mixer 12, which is then radiated as an output signal $S_{TX}$. The advantage of these specific embodiments is that the demands placed on the speed of signal processing in delay unit 5, test signal unit 9, and analysis unit 10 are lower than if, for example, the receive signal $S_{RX}$ had to be processed directly or if corresponding high-frequency delayed signals $S_{delay}$ or test signals $S_{test}$ had to be generated directly.

Figure 4:
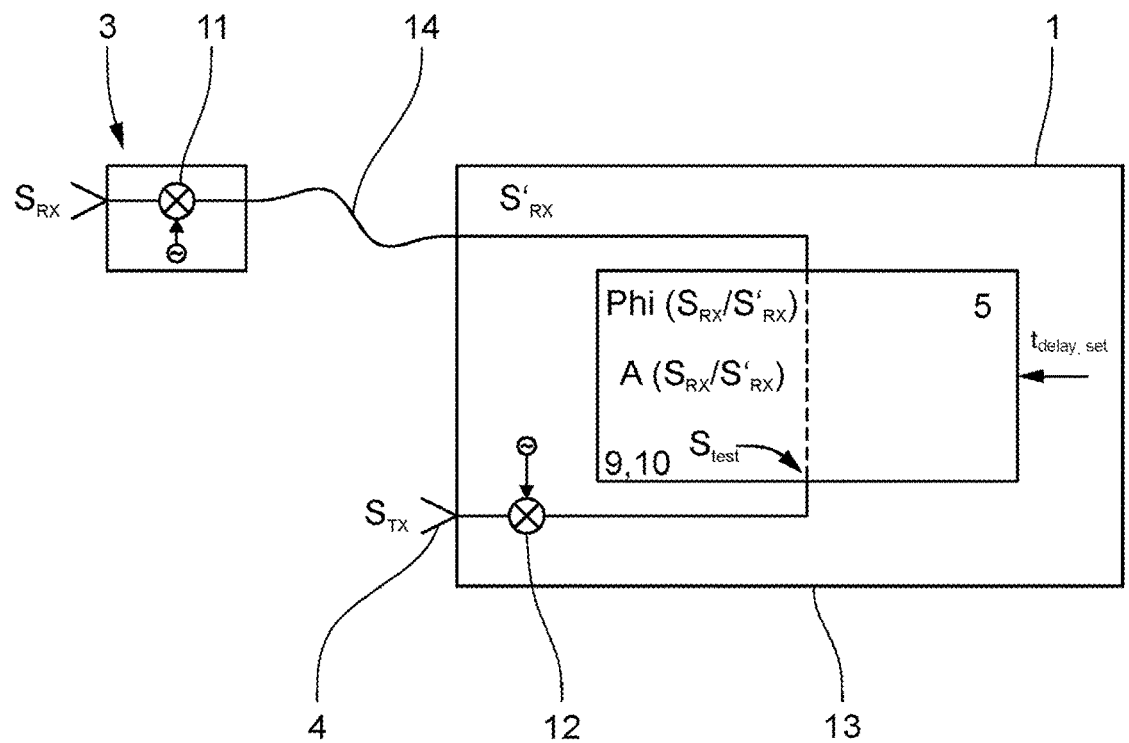
Figure 5:
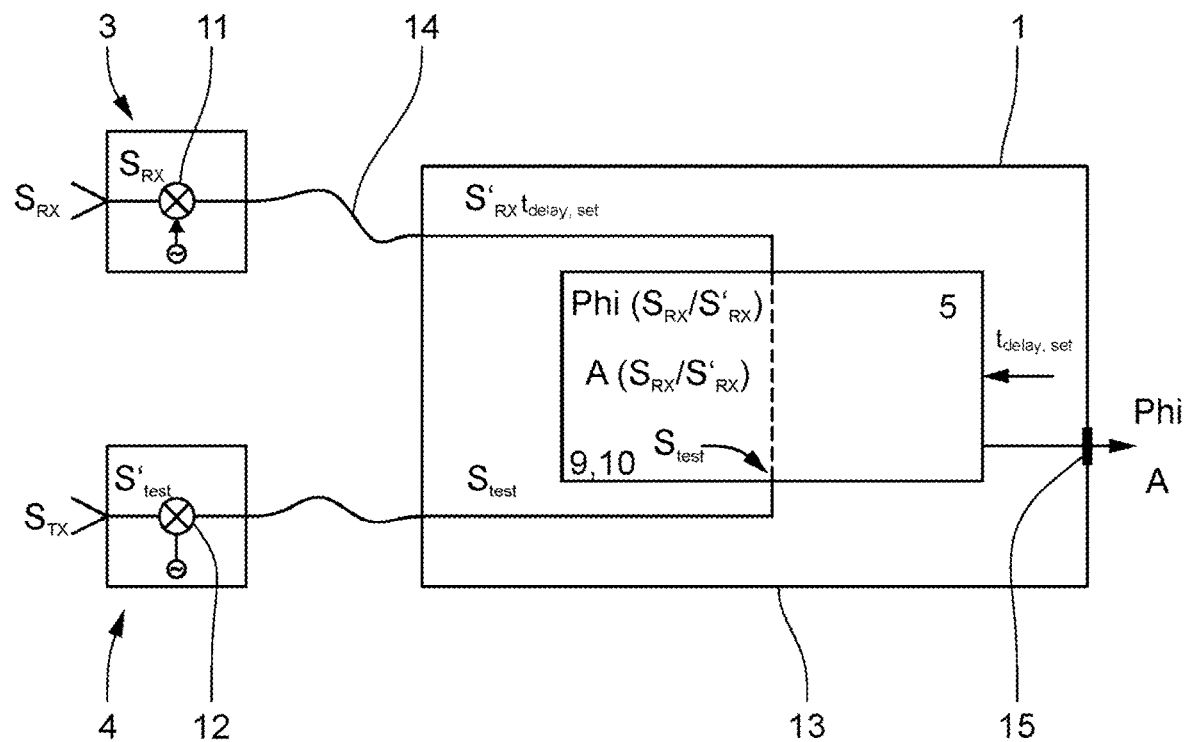
Figure 6:
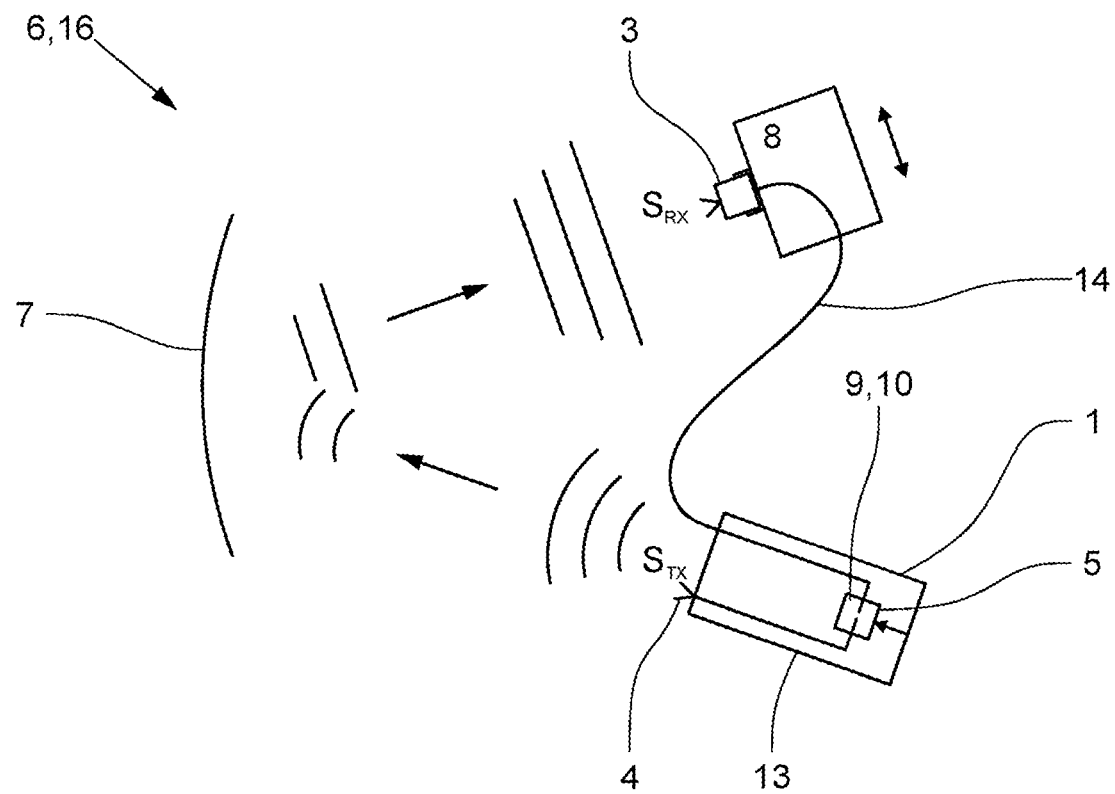
FIG. 6 schematically illustrates a testing device within a distance sensor test bench having a folded optical path, and a method for testing the distance sensor test bench.

In the exemplary embodiments shown in FIGS. 2 through 6, delay unit 5, test signal unit 9, and analysis unit 10 are enclosed by a housing 13. In FIGS. 4 through 6, receiving element 3 is connected to the housing via a signal line 14, which allows receiving element 3 to be positioned remotely from housing 13 of testing device 1. This has the advantage that receiving element 3 can be very easily moved to the position in distance sensor test bench 6 where the distance sensor 2 to be tested is usually located; i.e. in the normal simulation mode, namely in a mounting fixture of holding and positioning device 8, as illustrated in FIG. 6.

In the exemplary embodiments illustrated in FIGS. 2 through 6, analysis unit 10 determines the phase angle Phi of the receive signal $S_{RX}$ or the phase angle Phi of the derived receive signal $S'_{RX}$ with respect to a reference signal, which is the test signal $S_{test}$ or the derived test signal $S'_{test}$, respectively. Thus, according to the previously introduced and explained notation, the phase angle Phi is then a function of the transmit signal and of the receive signal; i.e., $Phi(S_{RX}/S'_{RX}, S_{test}/S'_{test})$.

The test signal units 9 shown in the various exemplary embodiments generate different test signals $S_{test}$, namely in the forms of a pulse, a pulse train, a continuous wave signal, and a frequency-modulated continuous wave signal. Accordingly, in the various exemplary embodiments, analysis unit 10 analyzes the receive signal $S_{RX}$ or the derived receive signal $S'_{RX}$ in terms of its phase angle Phi in different ways, namely via a phase detector or directly through propagation time measurement with respect to the test signal $S_{test}$ radiated as an output signal $S_{TX}$ or with respect to the derived test signal $S'_{test}$ radiated as an output signal $S_{TX}$.

The analysis units 10 of the testing devices shown in FIGS. 2 through 6 analyze a plurality of receive signals $S_{RX}$ or a plurality of derived receive signals $S'_{RX}$ in terms of phase angle Phi and/or in terms of amplitude A and store a plurality of values of phase angle Phi and/or amplitude A. Determining a plurality of values of phase angle Phi and/or amplitude A is useful because the position of receiving element 3 is usually varied in the test mode. Thus, the quiet zone of the distance sensor 2 to be tested in the simulation mode is scanned and measured linearly or two-dimensionally by positional variation of one or two position variables, as indicated in FIG. 6 by the double-headed arrow at holding and positioning device 8. The deviations of the measured phase angles Phi and/or amplitudes A from measurement point to measurement point are a measure of the planeness of the incoming waves in the quiet zone. The deviations allow a conclusion to be drawn as to whether the distance sensor test bench 6 to be tested still meets the accuracy requirements or needs to be recalibrated. The deviations may be determined in the testing device 1 itself, but this does not have to be the case.

The testing device 1 of FIG. 5 has a communication interface 15 via which testing device 1 can be connected to an external computer. Testing device 1 or, more precisely, analysis unit 10 then transfers the value of phase angle Phi and/or amplitude A of the receive signal $S_{RX}$ or of the derived receive signal $S'_{RX}$ via communication interface 15 to the external computer. The external computer can then perform the analysis with respect to the planeness of the received wave, especially if a plurality of determined phase angles and/or amplitudes have been transferred.

The testing device 1 of FIG. 5 is also used for transferring control commands, particularly from an external computer to testing device 1. Thus, in particular, testing device 1 may in particular receive, via the communication interface, an external request that causes test signal unit 9 to generate the test signal $S_{test}$ which is then radiated—possibly in the form of a derived test signal $S'_{test}$—as an output signal $S_{TX}$ via radiating element 4. Synchronously with the radiation of the output signal $S_{TX}$, analysis unit 10 analyzes the receive signal $S_{RX}$ or the derived receive signal $S'_{RX}$ in terms of its phase angle Phi and/or amplitude A. Receive signal $S_{RX}$ was caused by the transmitted test signal $S_{test}$.

FIG. 6 not only depicts a distance sensor test bench 6 having a folded optical path, but also illustrates the above-described method 16 for testing this distance sensor test bench 6. Distance sensor test bench 6 has a testing device 1 for testing a distance sensor 2 that operates using electromagnetic waves, a beam deflector 7, and a holding and positioning device 8 for receiving a distance sensor 2 to be tested in a mounting fixture. As described earlier, testing device 1 includes a receiving element 3, a radiating element 4, a delay unit 5, a test signal unit 9, and an analysis unit 10, the receiving element 3 serving for receiving an electromagnetic free-space wave as a receive signal $S_{RX}$, and the radiating element 4 serving for radiating an electromagnetic output signal $S_{TX}$. In the simulation mode, the receive signal $S_{RX}$ or a receive signal $S'_{RX}$ derived from the receive signal $S_{RX}$ is fed through delay unit 5 with a settable time delay $t_{delay, set}$ during the testing of distance sensor 2, and is thereby delayed to form a delayed signal $S_{delay}$ as a simulated reflected signal. In order to test distance sensor 2, the delayed signal $S_{delay}$ or a signal $S'_{delay}$ derived from the delayed signal $S_{delay}$ is radiated as an output signal ($S_{TX}$) via radiating element 4.

In the test mode that is actually of interest, test signal unit 9 generates a test signal $S_{test}$, and the test signal $S_{test}$ or a test signal $S'_{test}$ derived from the test signal $S_{test}$ is radiated as an output signal $S_{TX}$ via radiating element 4. Synchronously with the radiation of the test signal $S_{test}$ or of the derived test signal $S'_{test}$ as an output signal $S_{TX}$, analysis unit 10 analyzes the receive signal $S_{RX}$ or the derived receive signal $S'_{RX}$ in terms of its phase angle Phi and/or its amplitude A. Synchronous analysis means that the transmission of the test signal and the analysis of the receive signal are interrelated in time since the receive signal is usually the transmitted reflected test signal. For example, when the propagation time of a pulse is determined, transmission and analysis are performed synchronously, but slightly after one another in time. When a frequency-modulated continuous wave signal is used as a test signal, the transmission of the signal and the analysis of the receive signal are actually performed overlapping in time since the two signals are mixed together. In any case, the then determined value of phase angle Phi and/or amplitude A is stored, which is necessarily the case because the result of the calculation must be available in some form in analysis unit 10 from an information technology perspective.

Delay unit 5, test signal unit 9, and analysis unit 10 are enclosed by a housing 13 in the illustrated exemplary embodiments, including the exemplary embodiment of FIG. 6. Testing device 1 and its housing 13 is stationarily disposed in distance sensor test bench 6. Receiving element 3 is connected to housing 13 via a signal line 14, and thus can be positioned remotely from housing 13 of testing device 1. This allows receiving element 3 of testing device 1 to be placed in the mounting fixture of holding and positioning device 8 for purposes of testing distance sensor test bench 6. A plurality of test positions are approached in a plane in front of the receiving element 3 located in the mounting fixture of holding and positioning device 8. For this purpose, holding and positioning device 8 has suitable actuators that allow for accurate spatial positioning, especially of the mounting fixture of holding and positioning device 8 or of holding and positioning device 8 in its entirety.

At least one test operation is performed in each of a plurality of test positions, and in each case at least a phase angle Phi and/or an amplitude A is determined, and the determined value of phase angle Phi and/or amplitude A is stored.

Thus, with only a few additional device features that go beyond what is anyway required for the simulation mode, method 16 enables distance sensor test bench 6 to be tested; i.e., to check whether it is still calibrated such that plane wavefronts are present in a plane in front of the installed position of the distance sensor 2 to be tested.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 1 testing device
2 distance sensor
3 receiving element
4 radiating element
5 delay unit
6 distance sensor test bench
7 beam deflector
8 holding and positioning device
9 test signal unit
10 analysis unit
11 input mixer
12 output mixer
13 housing
14 signal line
15 communication interface
16 method
$S_{RX}$, $S'_{RX}$ receive signal, derived receive signal
$S_{TX}$, $S'_{TX}$ output signal, derived output signal
$t_{delay, set}$ set time delay
$S_{delay}$, $S'_{delay}$ delayed signal, derived delayed signal
$S_{test}$, $S'_{test}$ test signal, derived test signal
Phi phase angle
A amplitude

The invention claimed is:

1. A testing device for testing a distance sensor that operates using electromagnetic waves, the testing device comprising:
   a receiving element; and
   a radiating element;
   a delay unit;
   a test signal unit; and
   an analysis unit;
   wherein, in a simulation mode, the delay unit is configured to delay a receive signal ($S_{RX}$) received via the receiving element or a derived receive signal ($S'_{RX}$) based on a settable time delay ($t_{delay,\ set}$) to form a delayed signal ($S_{delay}$), and the radiating element is configured to radiate the delayed signal ($S_{delay}$) or a derived delayed signal ($S'_{delay}$); and
   wherein in a test mode:
      the test signal unit is configured to generate a test signal ($S_{test}$);
      the radiating element is configured to radiate the test signal ($S_{test}$) or a derived test signal ($S'_{test}$); and
      the analysis unit is configured to scan a quiet zone to measure planeness of incoming waves in the quiet zone, wherein scanning the quiet zone comprises determining phase angles (Phi) and/or amplitudes (A) of a plurality of receive signals ($S_{RX}$) or a plurality of derived receive signals ($S'_{RX}$).

2. The testing device according to claim 1, wherein the delay unit, the test signal unit, and the analysis unit are enclosed by a housing, and the receiving element is connected to the housing via a signal line such that the receiving element is positionable remotely from the housing of the testing device.

3. The testing device according to claim 2, wherein the receiving element has an input mixer configured to down-convert the receive signal ($S_{RX}$) to a lower intermediate frequency, and the signal line is configured to transfer the low-frequency receive signal ($S'_{RX}$) at least to the analysis unit enclosed by the housing.

4. The testing device according to claim 1, wherein the analysis unit is configured to determine the phase angles (Phi) with respect to a reference signal, wherein the reference signal is the test signal ($S_{test}$) or the derived test signal ($S'_{test}$).

5. The testing device according to claim 1, wherein the analysis unit is configured to determine the phase angles (Phi) through propagation time measurement with respect to the test signal ($S_{test}$) or the derived test signal ($S'_{test}$).

6. The testing device according to claim 1, wherein the test signal ($S_{test}$) or the derived test signal ($S'_{test}$) is a pulse, a pulse train, a continuous wave signal, or a frequency-modulated continuous wave signal.

7. The testing device according to claim 1, wherein the analysis unit is configured to transfer the determined phase angles (Phi) and/or amplitudes (A) via a communication interface to an external computer.

8. The testing device according to claim 7, wherein the test signal unit is configured to generate the test signal ($S_{test}$) in response to an external request received via the communication interface.

9. A method for testing a distance sensor test bench having a folded optical path, wherein the method comprises:

in a simulation mode, feeding a receive signal ($S_{RX}$) or a derived receive signal ($S'_{RX}$) through a delay unit of a testing device with a settable time delay ($t_{delay,\ set}$) during testing of a distance sensor to form a delayed signal ($S_{delay}$), and, in order to test the distance sensor, radiating the delayed signal ($S_{delay}$) or a derived delayed signal ($S'_{delay}$) via a radiating element of the testing device; and
   in a test mode:
      generating, by a test signal unit of the testing device, a test signal ($S_{test}$);
      radiating, by the radiating element of the testing device, the test signal ($S_{test}$) or a derived test signal ($S'_{test}$); and
      scanning a quiet zone to measure planeness of incoming waves in the quiet zone, wherein scanning the quiet zone comprises determining, by an analysis unit of the testing device, phase angles (Phi) and/or amplitudes (A) of a plurality of receive signals ($S_{RX}$) or a plurality of derived receive signals ($S'_{RX}$).

10. The method according to claim 9, wherein scanning the quiet zone is performed linearly based on positional variation of one position variable.

11. The method according to claim 9, wherein scanning the quiet zone is performed two-dimensionally based on positional variation of two position variables.

12. A non-transitory computer-readable medium having processor-executable instructions stored thereon for testing a distance sensor test bench having a folded optical path, wherein the processor-executable instructions, when executed, facilitate performance of the following:
   in a simulation mode, feeding a receive signal ($S_{RX}$) or a derived receive signal ($S'_{RX}$) through a delay unit of a testing device with a settable time delay ($t_{delay,\ set}$) during testing of a distance sensor to form a delayed signal ($S_{delay}$), and, in order to test the distance sensor, radiating the delayed signal ($S_{delay}$) or a derived delayed signal ($S'_{delay}$) via a radiating element of the testing device; and
   in a test mode:
      generating, by a test signal unit of the testing device, a test signal ($S_{test}$);
      radiating, by the radiating element of the testing device, the test signal ($S_{test}$) or a derived test signal ($S'_{test}$); and
      scanning a quiet zone to measure planeness of incoming waves in the quiet zone, wherein scanning the quiet zone comprises determining, by an analysis unit of the testing device, phase angles (Phi) and/or amplitudes (A) of a plurality of receive signals ($S_{RX}$) or a plurality of derived receive signals ($S'_{RX}$).

13. The non-transitory computer-readable medium according to claim 12, wherein scanning the quiet zone is performed linearly based on positional variation of one position variable.

14. The non-transitory computer-readable medium according to claim 12, wherein scanning the quiet zone is performed two-dimensionally based on positional variation of two position variables.

* * * * *